Jan. 3, 1956

R. I. HAMILTON 2,729,477

FLOATING PACKING RING ASSEMBLIES
FOR SEALING ROTARY SHAFTS

Filed Jan. 7, 1953

INVENTOR:
Russell I. Hamilton
BY
Robert Henderson
ATTORNEY

Jan. 3, 1956  R. I. HAMILTON  2,729,477
FLOATING PACKING RING ASSEMBLIES
FOR SEALING ROTARY SHAFTS
Filed Jan. 7, 1953  2 Sheets-Sheet 2
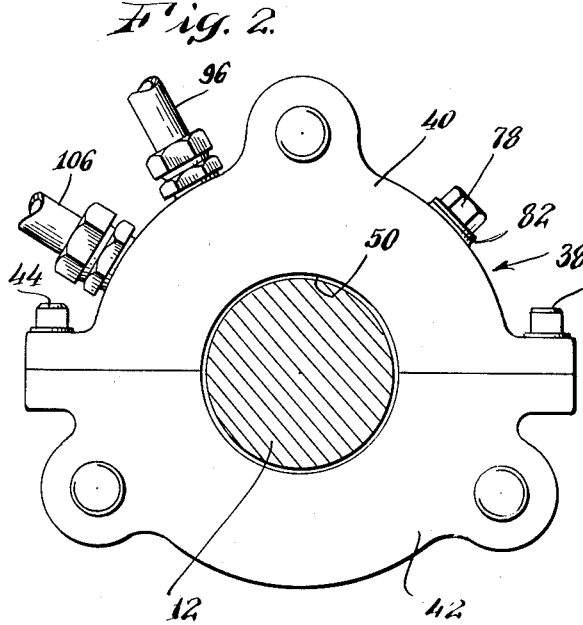
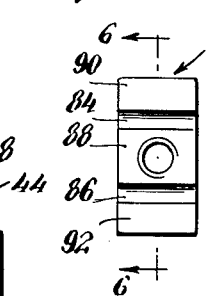
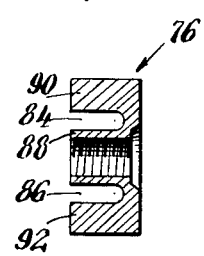
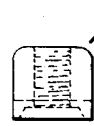
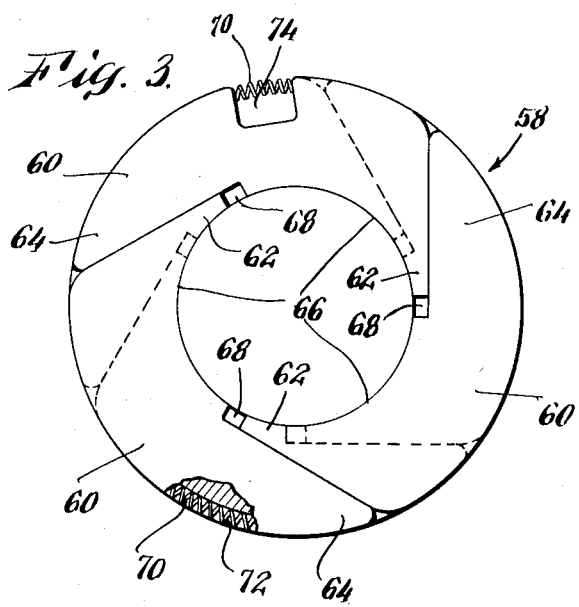
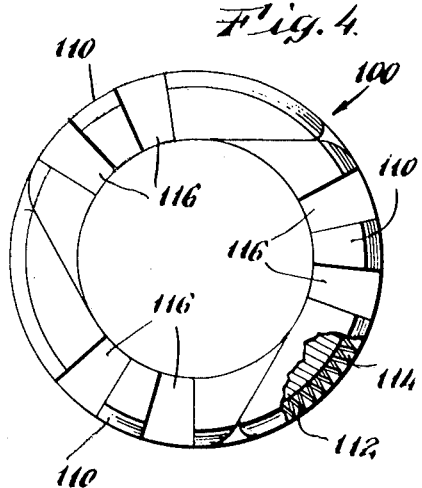
INVENTOR:
Russell I. Hamilton
BY
Robert Henderson
ATTORNEY.

ial sectional view of a floating packing and flinger ring assembly according to this invention as associated with a rotary stirrer

United States Patent Office 2,729,477
Patented Jan. 3, 1956

2,729,477

FLOATING PACKING RING ASSEMBLIES FOR SEALING ROTARY SHAFTS

Russell I. Hamilton, Palmyra, N. Y., assignor to The Garlock Packing Company, Palmyra, N. Y., a corporation of New York Application January 7, 1953, Serial No. 330,025

2 Claims. (Cl. 286—11.16)

The present invention relates generally to means for sealing a revolving shaft against the leakage or passage of fluid or foreign matter therealong. More particularly, it relates to a floating type of packing assembly which may be used for the purpose and which under certain conditions, as, for example, where excessive lubrication or contamination must be avoided, is superior to the packing generally employed for sealing rotary shafts.

Braided or rope packings have heretofore been used extensively for sealing rotary shafts in machines, but such packings rely for their sealing effects upon a tight sliding engagement with the rotating shaft. Such packings have at least three drawbacks, (1) the somewhat pliant packing materials tightly grip the shaft and therefore must be more or less flooded with lubricant to avoid excessive power losses so that excess lubricant contaminates materials being processed in the machine, (2) the tight grip, despite lubrication, causes excessive wear of the packings and the shaft, putting the machine out of service frequently during replacements of such worn parts, and (3) the excessive wear permits particles of the worn-away material, either shaft metal or packing material, to contaminate materials being processed in the machine. So-called oil seals, having a sealing flange tightly sliding upon a rotating shaft, have been used in place of braided or rope packings, but they, likewise, are subject to considerable wear and the need for lubrication with the same undesirable consequences as to excessive replacement expenses and as to contamination. Additionally, such oil seals are not well suited for use in the presence of substantial pressure conditions.

Floating packing rings have heretofore been used quite extensively for effecting a seal with respect to a reciprocating plunger or rod. In such arrangements, segmental packing rings have been disposed with a snug sliding fit upon the reciprocating rod and mounted within radially-oversize grooves provided in a surrounding machine casing or in a separate packing casing in which the packing rings may be arranged as a unitary structure.

Such segmental floating packing rings, however, have not heretofore been successfully used for sealing a rotary shaft. Without attempting to recite all the shortcomings of such an arrangement, it may be noted that in a rotary shaft arrangement there is a strong tendency for the rings to rotate with the shaft. In prior attempts to use floating segmental rings for sealing rotary shafts, artisans omitted to prevent rotation of the rings probably because when such rings were employed with reciprocating rods they were not inhibited against turning. When thus uninhibited in use with a rotary shaft, the rings would turn with the shaft, thereby wearing away the side walls of the casing grooves, leading to the consequences of excessive wear, excessive contamination, and frequent replacements. Although such floating segmental packing rings were entirely suitable for use with reciprocating shafts, all efforts hitherto made to use them with rotary shafts have failed. These failures probably resulted largely because of the reasons just stated and probably, also, because of a lack of appreciation, on the part of artisans, of different ways in which such rings could be adapted for use with rotary shafts.

An important field of usage for the present invention resides in the packing of shafts which extend into mixers or agitators within which are prepared medical mixtures or compounds such as, for example, penicillin and comparable substances. Of course, in packing shafts for use under such conditions, it is highly important to provide means which will prevent the ingress of lubricants or other foreign matter into the part of the machine which contains the substance being mixed. Additionally, it is highly desirable to provide means for killing bacteria which, despite the sealing means, may find its way along the shaft toward the substance being mixed.

Accordingly, it is an important object of this invention to provide an improved, effective, coating packing ring assembly capable of avoiding excess wear of a rotary shaft with which it is employed.

Another important object of this invention is the provision of a floating packing ring assembly for sealing a rotary shaft wherein positive means are provided for preventing rotation of the assembly with the shaft and for holding rings of a pair against relative rotation from predetermined related angular positions in which the splits in the rings of the pair are in non-alignment axially whereby to prevent the establishment of a leakage path past the pair of rings as would be the case if their splits were permitted to move into axial alignment.

Another important object of this invention is the provision of a floating packing ring assembly including means for killing bacteria which might find its way along the shaft sealed by the assembly.

These and other objects are attained according to the present invention by the use of at least one pair of segmental packing rings with means for preventing rotation of the rings with a related rotary shaft and for holding them in relative angular positions in which splits or breaches therein are not in axial alignment; said rings preferably being of carbon or other substantially self-lubricating material and arranged to be constricted positively but quite lightly upon the rotating shaft and proportioned to fit accurately in and to slide freely, transversely within a groove provided in a surrounding casing for holding said rings.

Additionally, and with some considerable advantage, a supplemental segmental ring may be provided in a separate groove adjacent to the packing rings and so constricted as to engage the shaft tightly and rotate therewith. This supplemental ring is so formed that it functions as a flinger ring which may receive and cast away the condensate of steam or some other bacteria-killing fluid which may be applied to the shaft at one side of the flinger ring. Where such a flinger ring is employed ,it, preferably, is segmental and also, preferably, is provided with plural radially extending slots which aid in its flinging action. This flinger ring, preferably, is associated with an annular groove adapted to receive condensate or other material which the ring flings aside, such condensate or other material being carried off from the latter groove by suitable means.

Although it will become apparent that the present invention may be practiced in various ways, nevertheless, for purposes of illustration and without limiting the invention specifically thereto, only a single embodiment thereof is described and illustrated herein as applied to a rotary rod in an agitator or mixer for preparing penicillin or other medical products.

In the drawings:

Figure 1 is a more or less schematic vertical sectional view of a floating packing and flinger ring assembly according to this invention as associated with a rotary stirrer or agitator shaft driven by a motor, the casing of which appears fragmentarily in the upper part of the drawing; stirrers or agitators (not shown) being located toward the lower end of the shaft in a batch container indicated fragmentarily at the bottom of the drawing.

Fig. 2 is a top plan view of a metal packing casing within which the floating rings are retained.

Fig. 3 is a plan view of a segmental packing ring indicating in broken lines the relative positions of segments in a similar, paired, underlying packing ring.

Fig. 4 is a top plan view of a segmental flinger ring such as is used in conjunction with the present packing ring assembly.

Fig. 5 is an inner-face view of a key employed in the present invention to prevent rotation of the floating packing rings and also to keep the two packing rings of a pair in a desired angular relationship with respect to each other.

Fig. 6 is a sectional view of such a key on the line 6—6 of Fig. 5.

Fig. 7 is an elevational view from either the top or the bottom of a key such as is illustrated in Figs. 5 and 6.

Figure 1:
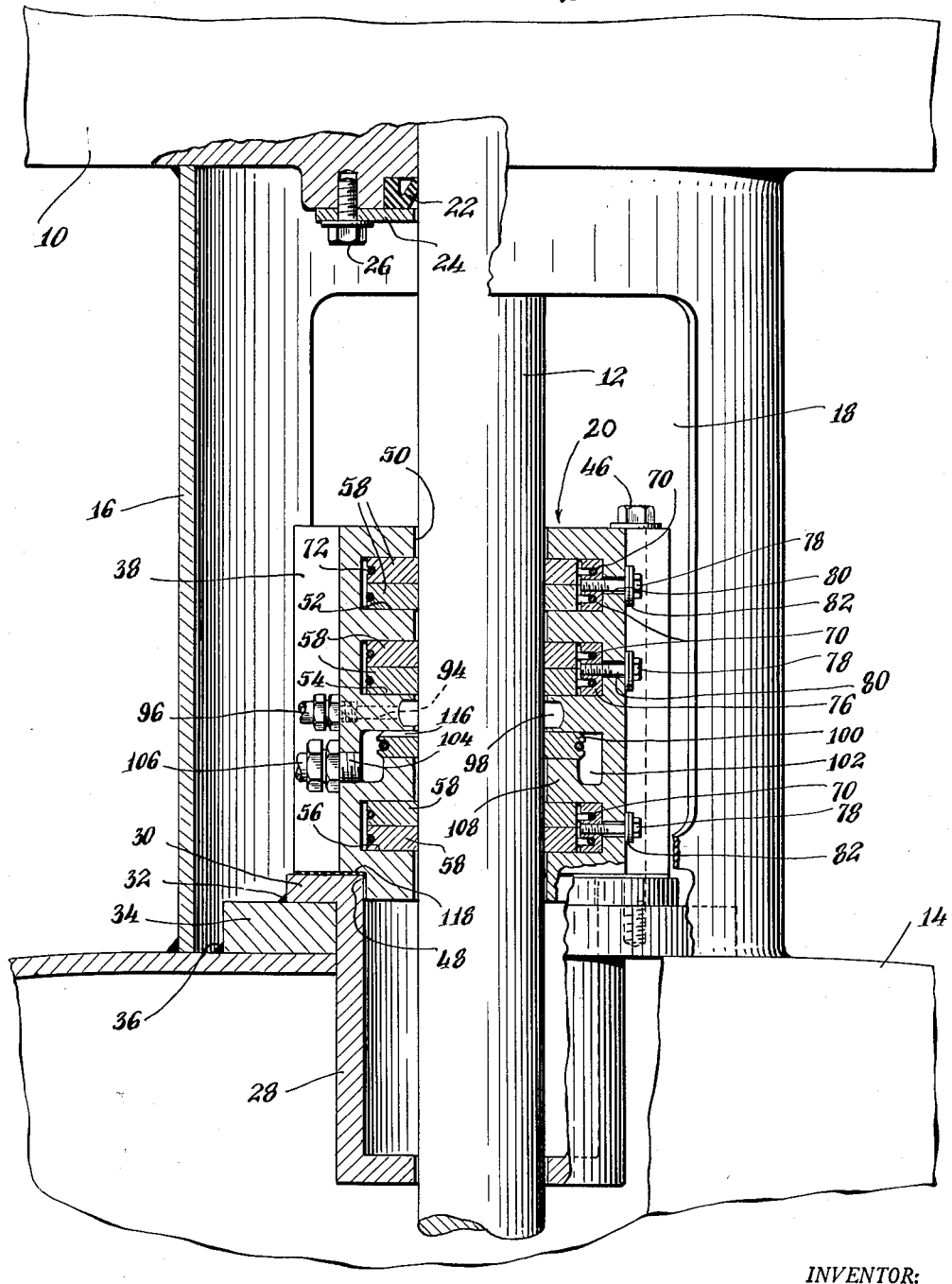

In Fig. 1 there is shown fragmentarily the lower portion of a casing 10 which may be, for example, a casing of a motor or a support for a motor which, through the medium of a vertical shaft 12, rotates mixing or agitating means (not shown) within a mixer or agitator or comparable container 14, which also is shown fragmentarily.

The motor casing 10 and the mixer casing 14 may be held in fixed relationship to each other by means of a rigid sleeve 16 having one or more relatively large side openings 18 affording access to the interior of the sleeve to permit the installation of a packing device 20 about the shaft which extends through said sleeve. A more or less conventional oil seal 22, held in place by a washer 24 and screws 26 (only one of the latter being shown), is provided at the bottom of the motor casing 10, to seal against the escape of lubricant or the like from the motor, downwardly along the shaft.

The packing device 20 is shown in the drawings as utilized in a machine which hitherto had been provided with an ordinary gland-type of packing; thus, the mixer 14, includes a stuffing box 28 having an upper flange 30 welded as at 32 to a collar 34 which, in turn, is welded as at 36 to the top wall of the casing 14. To adapt this machine for the use therein of the packing device according to this invention rather than the gland-type packing, it was necessary only to remove the packing from within the stuffing box 28 and assemble the packing device 20 upon the top of the stuffing box 28 in the manner hereinafter described; the removal of the old packing and the installation of the new packing device being accomplished through the opening or openings 18 in the sleeve 16.

The packing device 20 includes a generally cylindrical casing 38 which, as best seen in Fig. 2, consists of two semi-cylindrical casing portions 40, 42 which are held in their assembled relationship by cap screws 44. The adjacent flat faces of the semi-cylindrical casing portions 40 and 42 preferably are lapped together to make them fluid-tight, and, if desired, suitable gasketing may be interposed between those faces. The lower end of the packing casing 38 may be recessed as at 48 to permit it to become concentrically positioned upon the flange 30 of the stuffing box 28.

If the packing device is intended for use in a machine having no packing receptacle corresponding to stuffing box 28, the recess 48, preferably, would be of such size as to enable the packing casing 38 to seat concentrically within the shaft opening provided in the top wall of the agitator casing 14. The packing casing 38 is bolted tightly down upon the flange 30 or upon the top wall of the agitator 14 by means of long bolts 46, only one of which is shown in the drawings.

The packing casing 38 is provided with an axial bore 50 which is slightly larger in diameter than the shaft 12 to enable the latter to extend freely therethrough. The casing 38 also is formed with three similar, internal, annular grooves 52, 54, 56 for receiving, with an accurate laterally slidable fit therewithin, similar pairs of floating segmental sealing rings 58. The details of these floating rings may best be understood from Fig. 3, from which it may be seen that each sealing ring 58 consists of three tangential segments 60, each having a tangential nose 62 and a tangential tail 64 integral with the main body portion of each segment. The segments have interior arcuate surfaces 66 which, together, substantially surround the shaft when assembled for use.

The outer side of each nose 62 and the inner side of each tail 64 are formed with straight surfaces, and these straight surfaces of the nose of one segment and the tail of a next segment are in close sliding fit. The dimensions of said noses and tails preferably are such that a clear space 68 is provided at the end of each nose.

Each segmental ring 58 also has a garter spring 70 tensioned within an external groove 72 about the exterior of said segmental ring, whereby to keep the segments of said ring relatively tight upon the shaft with the arcuate surfaces 66 continuously conformed to the latter. As wear occurs at the arcuate surfaces 66 during use of the sealing device, the spaces 68 become somewhat smaller as each segment 60 reconforms itself to the surface of the shaft which extends through those segments.

In Fig. 3 of the drawings, one segmental sealing ring 58 is shown in full lines and a similar underlying segmental ring is indicated by broken lines. This shows the two segmental rings of the pair in the relative angular positions which they occupy in use with the splits at the contacting flat surfaces of the noses and tails of the several tangential segments of the two segmental rings in axial non-alignment so that there is no direct, unblocked, axial path which would permit fluid to pass along the shaft.

To assure that the two rings 58 of a pair will stay in such non-aligned, fluid-blocking, angular relationship in use, each such ring is provided with a single notch 74 in the periphery of one of its segments 60, but the corresponding notches in the two rings are in alignment only when the two said rings are in the mentioned axially non-aligned, fluid-blocking, angular relationship. A separate key 76, held fixedly in place in the bottom of each packing groove 52, 54 and 56 by a headed bolt 78 extending through a bolt hole 80 in packing casing 38 and threaded into said key, holds the latter in the two notches 74 of the two paired rings 58 in each packing groove to prevent rotation of the said packing rings relatively to the casing 38 and relatively to each other. A gasket 82 preferably is employed under the head of the bolt 78 to prevent leakage of fluid from the casing 38 at that point.

From Fig. 1, it may be seen that the paired segmental rings 58 are in intimate, face-to-face, interengagement and that they all effect a rotary sliding contact internally with the shaft 12 while the opposed outer sides of the paired segmental packing rings 58 are in intimate, radial, sliding engagement with the side walls of the packing grooves 52, 54 and 56. As the said grooves are of greater diameter than the packing rings 58 and the keys 76 do not extend to the bottoms of the notches 74, the rings 58 are free to slide radially in the grooves 52, 54 and 56 if the shaft should whip or otherwise shift laterally, while, nevertheless, maintaining a sliding seal with the packing casing at said grooves and a sliding seal with the shaft.

The keys 76 are of such width as to fit accurately but slidably within the two notches 74 of a pair of segmental packing rings. As best seen in Figs. 5 and 6, they are formed with grooves 84, 86 within which extend the garter springs 70 of said packing rings, the said grooves being of such depth that the said springs, normally, are clear of the groove bottoms. The said grooves define a central land 88 which extends radially between the two garter springs 70 of a pair of the segmental packing rings and two end lands 90, 92 which extend radially at the outer sides of each of said garter springs. Thus, the keys are in straddling, but non-interfering, relationship to the garter springs.

As the segmental packing rings are held against rotation in the manner described rather than being permitted to rotate with the shaft as would occur with unmodified use of prior segmental packing ring structures, there is no centrifugal force operative upon the segments 60; hence, the garter springs 70 may be designed for and/or adjusted to a relatively light contractile force only sufficient to maintain sliding, sealing engagement of the segment surfaces 66 with the shaft. The resulting light sliding engagement of the segments 60 with the shaft makes it feasible to utilize segmental rings having segments which, at least at their inner portions, are preferably formed of carbon, Bakelite, or some other bearing material which requires little or no supplemental lubrication. The maintenance of only relatively light tension in the garter springs not only permits the use of the mentioned materials while obviating flood lubrication with its attendant contamination and other difficulties, but avoids material wear which would occur in said materials if said springs were under substantial tension.

A packing assembly according to the present invention may advantageously include means for introducing and carrying off steam or other bacteria-killing fluid under pressure into the packing assembly and upon the shaft at an intermediate point in said assembly. Such means may include a radially extending intake bore or duct 94 in the casing adapted to receive steam (for example) from a pipe 96, connected to the outer end of said duct, and conduct the steam to an internal, steam groove 98 in which the steam is in ample bathing relationship to the surface of the shaft.

Immediately below the steam groove 98 (as viewed in Fig. 1) and separated from said groove only by one of the later's walls, is a flinger ring 100 disposed within a flinger groove 102 and adapted to throw steam condensate outwardly into an outer portion of the latter groove, from which the condensate and any foreign matter entrained with it, may be carried off through an exhaust duct 104 in the packing assembly casing into a connected exhaust pipe 106. The flinger groove 102, as viewed in radial section, is L-shaped, a horizontal leg of the L being occupied by the flinger ring 100 and an outer vertical leg of the L functioning as an annular catch basin to receive the condensate from the flinger ring. An internal shoulder 108 of the casing 38 defines the inner limit of the said catch basin, and a flat bottom surface of flinger ring 100 is in rotative, sliding engagement with a top flat surface of said shoulder while a flat top surface of the flinger ring is in rotative, sliding engagement with a bottom flat surface of the bottom wall of the steam groove 98.

The flinger ring 100 is similar to a single segmental sealing ring 58 in that it has tangential segments 110 which are somewhat similar in overall shape to the segments 60 of said sealing ring. Similarly, also, the segments 110 are constricted about the shaft 12 by a tensioned garter spring 112 seated within an outer annular groove 114. Unlike the arrangement of the paired sealing rings 58, the flinger ring 100 is not in any way keyed against rotation with the shaft; in fact, if desired, the tension of the spring 112 may be somewhat greater than the tension of springs 70 to more or less positively induce rotation of the flinger ring with the shaft. Plural radial slots 116 preferably are formed in the surface of the flinger ring 100 which is nearest to the steam groove 98. These slots, of which six are shown in Fig. 4, accentuate the flinging action of the flinger ring.

Assuming, for explanation of the use of the present invention, that this improved packing ring assembly is to be used as a replacement for conventional packing, the latter and any gland nut holding it in place in the stuffing box 28 are removed from the stuffing box through openings 18 in the sleeve 16. Completely closed or circular parts like the gland nut can be cut away in effecting this removal.

Then, with the new packing assembly disassembled, and working through the openings 18, the segments 60 of the six (three pairs) of sealing rings 58 are assembled about the shaft 12 and the garter springs 70 are connected in the grooves 72 to hold said sealing rings in assembled relationship upon the shaft. These springs normally are straight with hook ends and they are extended or wrapped around the packing rings, after which their hook ends are interconnected to give them the indicated form of circular, contractile garter springs. The single flinger ring 100 including its segments 110 and garter spring 112 is then similarly assembled about the shaft between two of the pairs of sealing rings 58, these, in the illustrated vertical arrangement, being the two lower pairs of rings 58.

Next, the sealing rings are individually rotated about the shaft 12 to the extent necessary to bring the notches 74 in all said sealing rings into axial alignment, after which one of the casing portions 40 or 42 is placed in position at one side of the shaft with the flinger ring 100 and the several sealing rings 58 extending into the grooves 102 and 52, 54 and 56; the several rings being slid along the shaft to the extent necessary to bring them into transverse alignment with said grooves. Then, the other of the casing portions 40 or 42 is put into place about the theretofore exposed sides of the flinger and sealing rings and the casing is bolted together as a unit by means of the bolts 44.

Prior to thus locating the packing casing about the shaft, the keys 76 are bolted into the casing portion 42 and, probably, the latter casing portion can be the first such portion to be put into place with the keys 76 extending into the aligned notches 74.

After the packing assembly has thus been completely assembled about the shaft, it may be loosely bolted down by bolts 46 to the flange 30 of the stuffing box 28, a suitable, preferably split, gasket 118 of relatively soft gasket material being interposed between the two. The bolt openings in the packing casing, for receiving bolts 46 therethrough, may advantageously be somewhat oversize so that, before the bolts 46 are finally tightened, the packing casing 38 may be brought into substantially perfect concentricity relatively to the shaft. To achieve this perfection in the concentricity of the packing casing, feeler gauges may advantageously be used between the shaft and said casing.

In the operation of the device, any lubricant or foreign matter passing along the shaft from the motor casing 10 is initially intercepted and its further passage along the shaft is substantially prevented by the pair of sealing rings nearest to said motor casing. As illustrated in Fig. 1, the sealing rings in groove 52 effect this initial sealing; and the sealing rings in groove 54 seal against further passage of lubricant or foreign matter which may have gotten past the rings in groove 52. Any steam or foreign matter tending to move along the shaft past the flinger ring 100 and toward the mixer 14 is effectively blocked by the sealing rings in groove 56, and the latter rings also seal against escape of any of the contents of said mixer along said shaft.

In one use of the device, as for processing penicillin in the mixer 14, steam at a temperature of 271° F. is introduced through pipe 96, into steam groove 98 and maintained at a pressure of about 28 pounds per square inch. There, the steam bathes and sterilizes the shaft so that, even if lubricant or foreign matter tends to move toward the penicillin in the mixer, it would not carry live bacteria with it. The steam, condensate and any entrained foreign matter, after leaving steam groove 98, encounters the flinger ring 100 which throws it into flinger groove 102, whence it is carried off through duct 104 and pipe 106. If any foreign matter gets past the flinger ring, along the shaft, it is intercepted by the sealing rings in groove 56.

Lubricant from the motor casing 10 would be at about atmospheric pressure and the contents of the mixer 14 would be at the relatively low pressure of about 10 pounds per square inch. Hence, the sealing rings, respectively, in grooves 52 and 56 can effectively seal against the undesired movement of the lubricant and the mixer contents along the shaft while the garter springs of said rings may be at a very light tension with resultant negligible wear on said rings.

The flinger ring 100 per se, the flinging action of said ring, and the sealing effect of the sealing rings in groove 56 combine to prevent ingress of steam and entrained foreign matter into the mixer 14 and to prevent escape of the contents of said mixer. Also, if any avenue of movement for such materials were to develop between the steam groove 98 and the mixer 14, the pressure of the steam at about 28 pounds per square inch would be preponderant over the relatively low pressure of about 10 pounds per square inch, thereby operating as a further means for preventing escape of the contents of the mixer. On the other hand, the steam is substantially prevented from getting into the mixer as the steam's pressure is substantially dissipated before it passes beyond groove 56.

As with the rings in groove 56, the springs of the rings in grooves 52 and 54 may be under very light tension to substantially obviate wear of said rings. However, if the pressure of the steam were to get underneath the inner peripheries of the rings in groove 54 and tend to expand those rings, the tension of their garter springs may be increased sufficiently to overcome such tendency.

It has been found in practice that a packing assembly according to this invention is highly effective while involving only negligible wear of parts and only infrequent servicing. It is also highly useful where sterilization is desired. The device is easily installed without removing the shaft and is useful either as a replacement for an old stuffing-box packing or as a new installation in which the stuffing box may be omitted.

Although only a single embodiment of the invention is illustrated and described herein, it is obvious that the inventive concept may be utilized in various other ways without departing from the invention as set forth in the following claims.

I claim:

1. A sealing device for effecting a seal between a rotary shaft and a machine-casing opening into which such shaft extends, comprising a packing casing adapted for fixed sealing association with said opening and having a shaft passage therein substantially coaxial with said opening and an internal annular groove therein, a pair of substantially similar, flat-sided, segmental sealing rings, having segments which are slidable laterally in said groove, spring means extending circumferentially about said pair of segmental sealing rings to provide contraction of the rings to adapt the latter for sliding, sealing engagement, at their inner peripheries, with the shaft, and which rings are in intimate, substantially sealed, side-face to side-face association with each other and with the side walls of said groove, and means coacting with said packing casing and with both said segmental rings to hold said rings in relative angular positions in which the segment junctures are in axial non-alignment and to prevent rotation of said rings relative to the packing casing; said sealing rings having, in one segment of each thereof, a similar peripheral notch extending throughout the thickness of each one of said rings, which notches have approximately radially extending, opposite, flat, side walls parallel to each other, the segments of the two sealing rings being in axial non-alignment when said notches are in axial alignment, and said means comprising a key fixed to the bottom of said groove and having parallel, flat, side walls extending radially inwardly in said groove and within said notches of the two rings in accurate, face-to-face, sliding association with said flat, side walls of said notches, whereby to prevent rotation of said rings and to hold said rings in segmental non-alignment.

2. A sealing device according to claim 1, wherein said spring means comprises a pair of circular, contractile springs extending circumferentially about said segmental rings, said key having a pair of radially inwardly facing grooves adapted to accommodate said springs freely therewithin.

References Cited in the file of this patent

UNITED STATES PATENTS

| | | |
|---|---|---|
| 722,269 | Walters | Mar. 10, 1903 |
| 849,115 | France | Apr. 2, 1907 |
| 870,152 | Alberger | Nov. 5, 1907 |
| 1,104,588 | Wagner | July 21, 1914 |
| 1,331,522 | Parsons et al. | Feb. 24, 1920 |
| 1,879,855 | Morton | Sept. 27, 1932 |
| 2,071,914 | Bentley | Feb. 23, 1937 |
| 2,272,455 | Withington | Feb. 10, 1942 |